US008209085B2

(12) United States Patent
Yang et al.

(10) Patent No.: US 8,209,085 B2
(45) Date of Patent: Jun. 26, 2012

(54) AUDIO NOISE REDUCTION METHOD FOR TELEMATICS SYSTEM

(75) Inventors: Wan-ping Yang, Farmington Hills, MI (US); Hiroaki Shibata, Novi, MI (US); Koji Shinoda, Farmington Hills, MI (US); Hyunjo Seo, Northville, MI (US); Mustafa Mahmoud, Farmington, MI (US); Yi Jiang, Southfield, MI (US); Thomas Shi, Rochester Hills, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 370 days.

(21) Appl. No.: 12/710,528

(22) Filed: Feb. 23, 2010

(65) Prior Publication Data

US 2011/0208388 A1 Aug. 25, 2011

(51) Int. Cl.
*G06F 7/00* (2006.01)

(52) U.S. Cl. .......................................................... 701/36

(58) Field of Classification Search ........................ None
See application file for complete search history.

(56) References Cited

U.S. PATENT DOCUMENTS

| | | | | |
|---|---|---|---|---|
| 8,155,867 | B2 * | 4/2012 | Krause | 701/123 |
| 2008/0212820 | A1 * | 9/2008 | Park | 381/370 |
| 2010/0136944 | A1 * | 6/2010 | Taylor et al. | 455/404.1 |

* cited by examiner

*Primary Examiner* — Kaitlin Joerger
*Assistant Examiner* — Prasad Gokhale
(74) *Attorney, Agent, or Firm* — Harness, Dickey & Pierce, PLC

(57) ABSTRACT

A telematics system for a vehicle includes an infotainment module, a codec module, and a control module. The infotainment module outputs data to a speaker via a first audio data path. The codec module outputs data to the speaker via a second audio data path when a telematics function of the telematics system is triggered. The control module switches from the first audio data path to the second audio data path after the telematics function is triggered. The control module changes a state of a relay of the speaker and a gain of the codec module in a first predetermined order before outputting data to the speaker via the second audio data path.

19 Claims, 4 Drawing Sheets

AUDIO NOISE REDUCTION METHOD FOR TELEMATICS SYSTEM

FIELD

The present disclosure relates generally to telematics systems and more particularly to telematics systems used in vehicles.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Nowadays, many vehicles include telematics systems that provide various telematics functions. The telematics functions include infotainment and safety-related functions. For example, the telematics systems can provide audiovisual infotainment assistance to vehicle occupants. Additionally, the telematics systems can be used to automatically or interactively request medical and/or roadside assistance in case of an emergency.

SUMMARY

A telematics system for a vehicle comprises an infotainment module, a codec module, and a control module. The infotainment module outputs data to a speaker via a first audio data path. The codec module outputs data to the speaker via a second audio data path when a telematics function of the telematics system is triggered. The control module switches from the first audio data path to the second audio data path after the telematics function is triggered. The control module changes a state of a relay of the speaker and a gain of the codec module in a first predetermined order before outputting data to the speaker via the second audio data path.

In another feature, the first predetermined order includes initially switching from the first audio data path to the second audio data path, then changing the state of the relay from off to on, and then changing the gain of the codec module from a mute level to a desired level.

In another feature, the control module switches from the second audio data path to the first audio data path after the telematics function is completed, and changes the state of the relay and the gain of the codec module in a second predetermined order before outputting data to the speaker via the first audio data path.

In another feature, the second predetermined order includes initially changing the state of the relay from on to off, then changing the gain of the codec module to a mute level, and then switching from the second audio data path to the first audio data path.

In another feature, after the telematics system is initialized and after the telematics function is completed, before outputting data to the speaker, the control module sets the state of the relay to off, sets the gain of the codec module to a mute level, and selects the first audio data path.

In another feature, the telematics function is triggered based on an input received from one of a user interface of the telematics system and a sensor in the vehicle.

In another feature, the telematics system further comprises a validation module that validates inputs triggering the telematics function and that delays triggering of the telematics function until the inputs are validated.

In another feature, the codec module outputs a beep sound to the speaker when a first predetermined time period has elapsed after the gain of the codec module is changed to the desired level, and a voice prompt after the beep is completed.

In another feature, the control module switches from the second audio data path to the first audio data path after initially, a first predetermined time period has elapsed after the telematics function is completed, then the gain of the codec module is changed to a desired level, then a second predetermined time period has elapsed, and then a beep sound output to the speaker is completed.

In still other features, a telematics system for a vehicle comprises an infotainment module, a codec module, and a control module. The infotainment module outputs data to a speaker via a first audio data path. The codec module that outputs data to the speaker via a second audio data path. The control module initiates a telematics function based on an input received from one of a user interface of the telematics system and a sensor in the vehicle. The control module turns off a relay of the speaker, sets a gain of the codec module to a mute level, and selects the first audio data path in a first order before outputting data to the speaker when the telematics system is initialized and when the telematics function is completed. The control module turns on the relay, changes the gain, and selects the second audio data path in a second order before outputting data to the speaker when the telematics function is initiated.

In still other features, a method for operating a telematics system of a vehicle comprises outputting infotainment data to a speaker via a first audio data path and outputting data from a codec module of the telematics system to the speaker via a second audio data path when a telematics function is triggered. The method further comprises switching from the first audio data path to the second audio data path after the telematics function is triggered and changing a state of a relay of the speaker and a gain of the codec module in a first predetermined order before outputting data to the speaker via the second audio data path.

In other features, the method further comprises including in the first predetermined order, initially switching from the first audio data path to the second audio data path, then changing the state of the relay from off to on, and then changing the gain of the codec module from a mute level to a desired level.

In other features, the method further comprises switching from the second audio data path to the first audio data path after the telematics function is completed and changing the state of the relay and the gain of the codec module in a second predetermined order before outputting data to the speaker via the first audio data path.

In other features, the method further comprises including in the second predetermined order, initially changing the state of the relay from on to off, then changing the gain of the codec module to a mute level, and then switching from the second audio data path to the first audio data path.

In other features, the method further comprises, after the method is initialized and after the telematics function is completed, before outputting data to the speaker, setting the state of the relay to off, setting the gain of the codec module to a mute level and selecting the first audio data path.

In another feature, the method further comprises triggering the telematics function based on an input received from one of a user interface of the telematics system and a sensor in the vehicle.

In other features, the method further comprises validating inputs triggering the telematics function and delaying triggering of the telematics function until the inputs are validated.

In other features, the method further comprises outputting from the codec module, a beep sound to the speaker when a first predetermined time period has elapsed after the gain of the codec module is changed to the desired level, and a voice prompt after the beep is completed.

In other features, the method further comprises switching from the second audio data path to the first audio data path after initially waiting for a first predetermined time period to elapse after the telematics function is completed, then changing the gain of the codec to a desired level, then waiting for a second predetermined time period to elapse, then outputting a beep sound to the speaker, and then waiting for the beep sound to complete.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
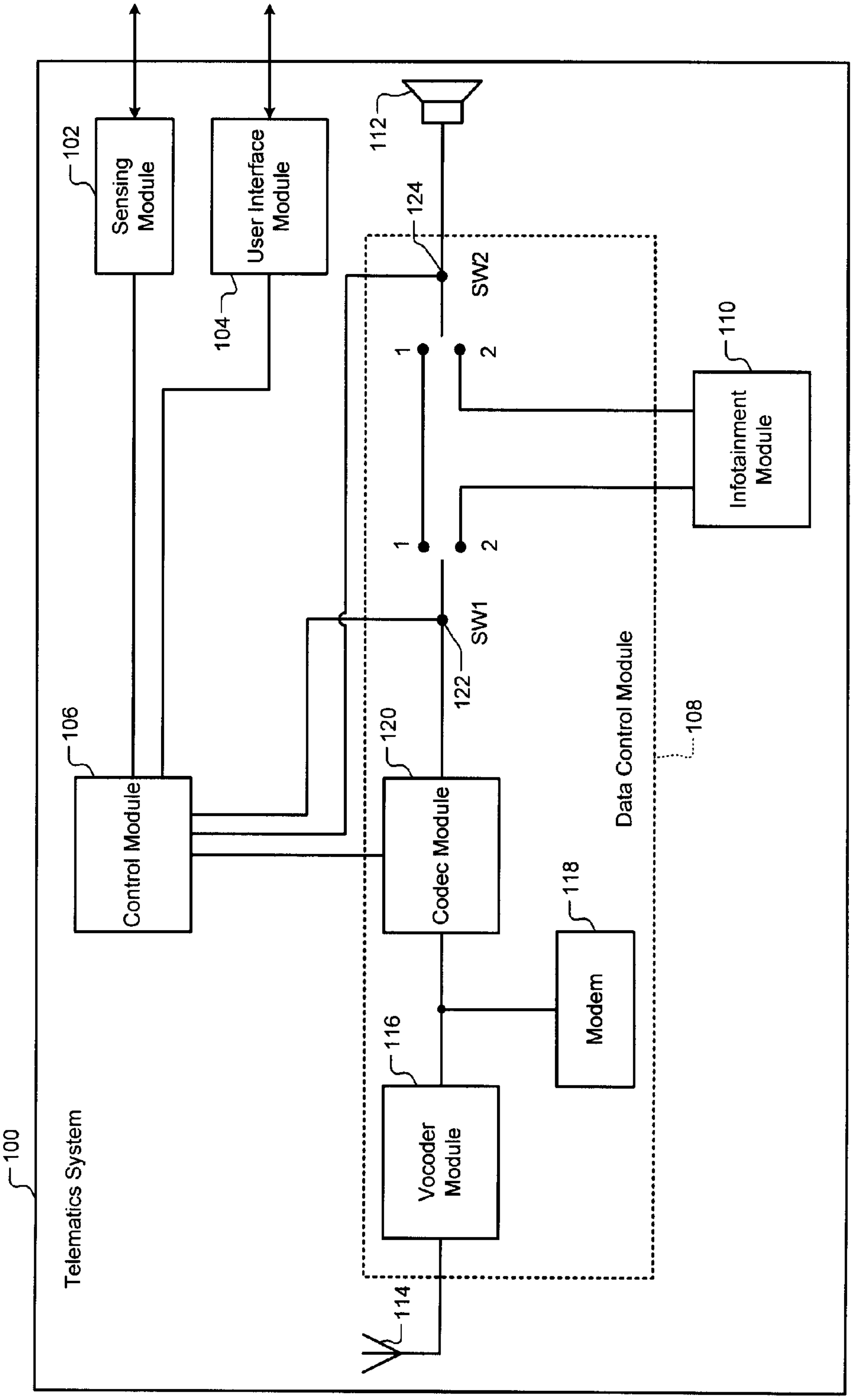
FIG. 1 is a functional block diagram of an exemplary telematics system of a vehicle.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, a telematics system 100 of a vehicle comprises a sensing module 102, a user interface module 104, a control module 106, a data control module 108, an infotainment module 110, a speaker 112, and an antenna 114. The telematics system 100 communicates with a service center via the antenna 114.

The sensing module 102 communicates with various sensors (not shown) located in other systems of the vehicle. The user interface module 104 allows an occupant of the vehicle to interact with the telematics system 100. The control module 106 controls the telematics system 100. The data control module 108 controls data flow between the telematics system 100 and the service center. The infotainment module 110 provides infotainment assistance to the occupants of the vehicle. The speaker 112 outputs sounds including beeps, voice prompts, and voice messages. The sounds may be generated based on data provided by the infotainment module 110 and/or the service center.

More specifically, the sensing module 102 may receive data sensed by various sensors. The data may include operational data and event-based data. For example, the operational data may include tire pressure, levels and properties of various fluids used in the vehicle, and so on. The event-based data may include data generated by sensors in an accident, for example.

The user interface module 104 may comprise a switch and a plurality of light emitting diodes (LEDs) (not shown). In some implementations, the user interface module 104 may also include the speaker 112. The occupants of the vehicle may interact with the telematics system 100 using the switch, the LEDs, and the speaker 112.

For example, the occupants may press the switch to request assistance in case of an emergency. The emergency may include medical and/or roadside emergency. The telematics system 100 may transmit a message comprising the requested assistance to the service center. The LEDs may indicate a visual response from the service center. The speaker 112 may indicate an audio response from the service center. Additionally, the speaker 112 may output infotainment data (e.g., driving instructions) from the infotainment module 110.

The control module 106 receives inputs from the sensing module 102 and the user interface module 104. The control module 106 controls communications between the telematics system 100 and the service center based on the inputs received from the sensing module 102 and the user interface module 104.

Additionally, the control module 106 may communicate with other systems (e.g., a diagnostics system) of the vehicle. The control module 106 may forward data received from the service center to these systems. For example, the data may include service data, configuration data, system upgrade/update data, and so on. The service center may send the data in response to the data sensed by the sensors.

The data control module 108 comprises a vocoder module 116, a modem 118, a codec module 120, and switches SW1 122 and SW2 124. The data control module 108 includes two audio data paths: an internal audio data path and an external audio data path. The switch SW1 122 is an audio data path selection switch (hereinafter switch SW1 122) that selects the internal audio data path when set to position 1 and that selects the external audio data path when set to position 2.

The switch SW2 124 is a speaker relay (hereinafter relay 124). The relay 124 connects the internal audio data path to the speaker 112 when the relay 124 is on and is set to position 1. The relay 124 connects the external audio data path to the speaker 112 when the relay 124 is on and is set to position 2. The relay 124 does not connect the internal or external audio data path to the speaker 112 when the relay is off (e.g., tri-stated). The relay 124 is neither in position 1 nor in position 2 when the relay is off. The switch SW1 122 and the relay 124 may be implemented by any semiconductor switching devices.

The vocoder module 116 includes a voice encoder to encode voice data. The modem 118 includes a modulator/demodulator. The codec module 120 includes a coder/decoder. The codec module 120 controls the volume of the speaker 112. The codec module 120 converts data from analog-to-digital format and from digital-to-analog format depending on the direction of the data flow.

The internal audio data path is used when data from the sensing module 102 and/or the user interface module 104 are transmitted to the service center. The internal audio data path is also used when data from the service center are output to the user interface module 104 and to other systems of the vehicle.

The external audio data path is used when data from the infotainment module 110 are output to the speaker 112. The control module 106 selects the internal or external audio data path by controlling the position of the switch SW1 122. The control module 106 selects the internal audio data path by setting the position of the switch SW1 122 to position 1. The control module 106 selects the external audio data path by setting the position of the switch SW1 122 to position 2.

The control module 106 activates (turns on) the relay 124 when sounds are output to the speaker 112 via the internal and/or external audio data path. Further, the control module 106 sets the position of the relay 124 to position 1 when the internal audio data path is selected. The control module 106 sets the position of the relay 124 to position 2 when the external audio data path is selected. Thus, the switch SW1 122 and the relay 124 are in position 1 when the internal audio data path is selected and are in position 2 when the external audio data path is selected.

Normally, the telematics system 100 provides infotainment information to the occupants via the speaker 112. Accordingly, the control module 106 normally selects the external audio data path comprising the infotainment module 110. That is, normally, the switch SW1 122 and the relay 124 are in position 2. The control module 106 switches to the internal audio data path based on the inputs from the sensing module 102 and/or the user interface module 104.

Typically, most telematics functions are triggered by sensor inputs and are performed automatically (i.e., without user interaction). Generally, after a telematics function is triggered, an audio feedback may be provided to the occupant via the speaker 112. Accordingly, by switching between the internal and external audio data paths, a single audio channel of the data control module 108 is utilized to exchange data between the telematics system 100 and the service center and to provide the audio feedback.

Switching between the internal and external audio data paths, however, may introduce noise (e.g., a loud pop sound) before outputting any sound following the switch. The noise may be called switching noise. The codec module 120 and the relay 124 contribute to the switching noise. Traditionally, complex circuits and/or computationally intensive processes may be used to minimize the switching noise. These traditional approaches, however, may increase size and cost of the telematics systems.

Instead, the present disclosure relates to minimizing the switching noise by controlling order and timing of switching audio data paths. Additionally, the gain of the codec module (i.e., speaker volume) is controlled while switching the audio data paths.

Specifically, the telematics system is initialized to a predetermined state before outputting any sound via the speaker. Additionally, the telematics system is set to the same predetermined state after a triggered telematics function is completed. Accordingly, the telematics system is in the same state before a sound is output to the speaker via an audio data path regardless of which audio data path is selected.

More specifically, after the telematics system is powered on (initialized) and after completion of a triggered telematics function, the state of the telematics system is set as follows. The relay is off, the codec is mute, and the audio data path is external.

When a telematics function is triggered, the state of the telematics system is switched in the following order. The audio data path is first set to internal. Then the relay is turned on and set to position 1. Thereafter, a gain of the codec module is set to a suitable level.

Specifically, the audio data path is first switched to the internal audio data path after a predetermined delay. Then the relay is turned on and set to position 1. Thereafter, the gain of the codec module is changed from a mute level to a suitable level. After a predetermined delay, a sound (e.g., a beep followed by a voice prompt, etc.) is output to the speaker.

When the triggered telematics function is completed, the telematics system is returned to the predetermined state in the following order. First, the relay is turned off. Then the codec is muted. Thereafter, the audio data path is set to external.

Specifically, when the triggered telematics function is completed, a beep is output to the speaker after a predetermined delay to indicate completion of the triggered telematics function. After the beep is completed, the relay is turned off, the codec is muted, and then the audio data path is switched to the external audio data path.

Figure 2:
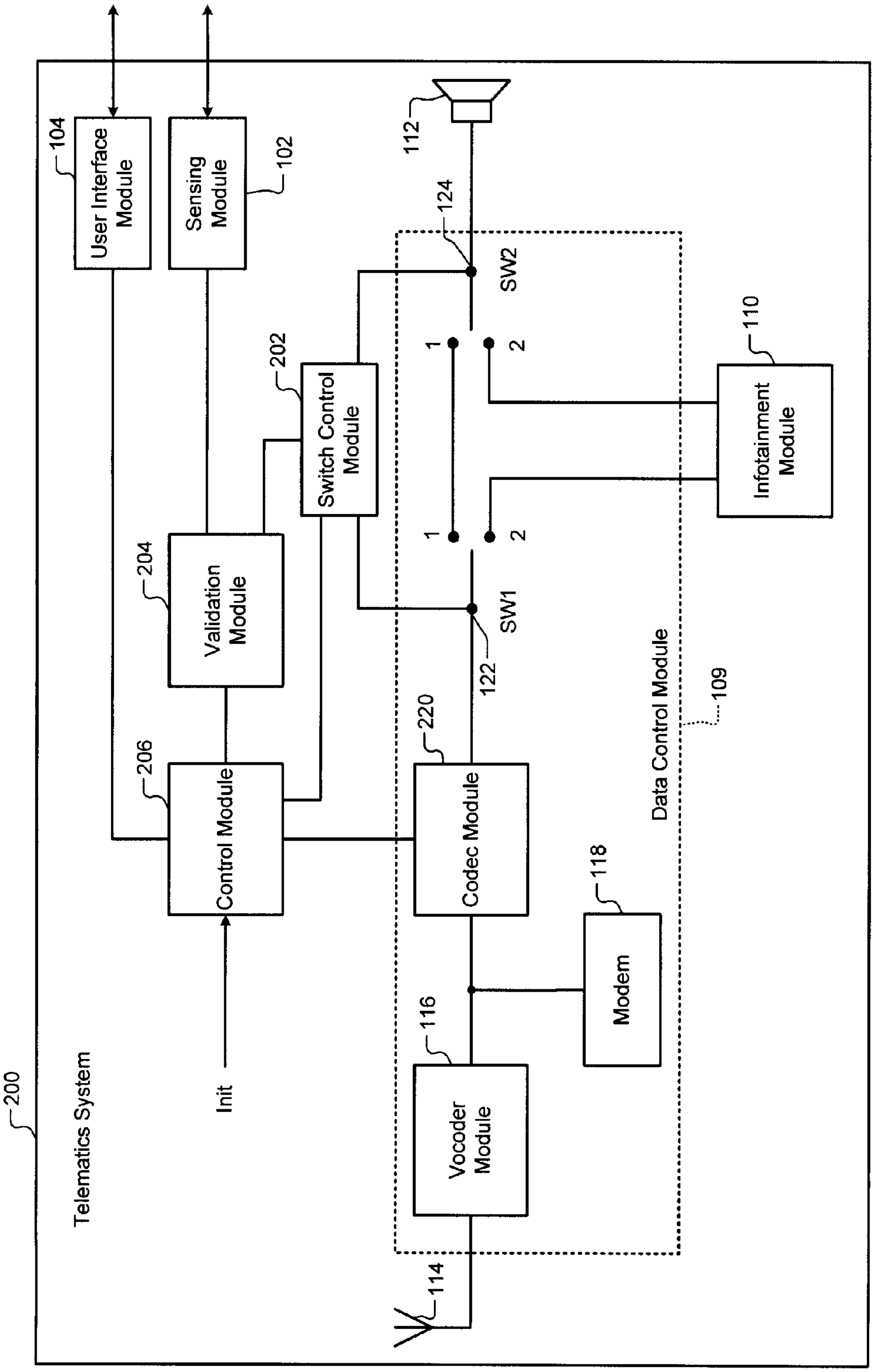
FIG. 2 is a functional block diagram of an exemplary telematics system of a vehicle that minimizes noise when switching audio data paths from external to internal audio data paths and vice versa.

Referring now to FIG. 2, a telematics system 200 that minimizes the switching noise according to the present disclosure is shown. The telematics system 200 comprises the sensing module 102, the user interface module 104, the infotainment module 110, the speaker 112, the relay 124, and the antenna 114.

Additionally, the telematics system 200 comprises a switch control module 202, a validation module 204, a control module 206, and a data control module 109. The data control module 109 comprises the vocoder module 116, the modem 118, the switch SW1 122, the relay 124, and a codec module 220.

The switch control module 202 controls the switch SW1 122 to switch the audio data paths according to a path control signal generated by the control module 206. Additionally, the switch control module 202 controls the relay 124 according to a relay control signal generated by the control module 206. The switch control module 202 turns the relay 124 on or off according to the relay control signal. Further, the switch control module 202 sets the relay 124 to position 1 or position 2 according to the path control signal.

The validation module 204 validates signals received from the sensing module 102. For example, the validation module 204 uses a timer and determines that a sensor signal received from the sensing module 102 is a valid signal if a state of the sensor signal before the timer starts and after the timer expires is the same.

Additionally, the validation module 204 debounces the switch SW1 122 and the relay 124 when the audio data path is changed from internal to external and vice versa. For example, the validation module 204 may use timers to debounce the switch SW1 122 and the relay 124.

The control module 206 initiates appropriate telematics functions corresponding to validated sensor signals received from the switch control module 202. The control module 206 may initiate additional telematics functions when an occupant presses a switch on the user interface module 104. The user interface module 104 debounces the switch before outputting a signal to the control module 206.

The control module 206 receives a power-on or a reset signal called an init signal. The init signal initializes the telematics system 200. When the telematics system 200 is initialized, the control module 206 sets the relay 124, the gain of the codec module 220 (i.e., the volume of the speaker 112), and the audio data path to predetermined states as follows.

The relay 124 is turned off, the gain of the codec module 220 is set to a mute level, and the audio data path is set to external (i.e., the switch SW1 122 is set to position 2). Specifically, after receiving the init signal, the control module 206 generates the relay control signal, a gain control signal, and the path control signal. The relay control signal turns off the relay 124. The gain control signal sets the gain of the codec module 220 to the mute level. The path control signal sets the switch SW1 122 to position 2 to set the audio data path to external.

Additionally, the control module 206 sets these predetermined states when a telematics function initiated by a validated sensor signal or by pressing the switch on the user interface module 104 is completed. Thus, the control module 206 ensures that these predetermined states are set at initialization and at the end of each telematics function before any sound is output to the speaker 112 by a triggered telematics function. In other words, these predetermined states are the default states, where the infotainment module 110 utilizes the external audio data path to provide infotainment information to the occupants.

A telematics function may be triggered by a validated sensor signal or by pressing the switch on the user interface module 104. When a telematics function is triggered, the control module 206 controls the order and timing of switching the relay 124, the gain, and the audio data path as follows. Specifically, the control module 206 switches the audio data path from external to internal without generating switching noise by controlling the gain, the switch SW1 122, and the relay 124 as follows.

For example, after receiving a validated sensor signal (or an input from the user interface module 104), the control module 206 first sets the audio data path to internal. The control module 206 generates the path control signal and sets the switch SW1 122 to position 1.

Then the control module 206 turns on the relay 124 by generating (toggling) the relay control signal and sets the relay 124 to position 1. Thereafter, the control module 206 changes the gain of the codec module 220 from the mute level to a suitable level.

Subsequently, the control module 206 starts a timer. For example only, the timer may be 200 ms. After the timer expires, the control module 206 signals the codec module 220 to play a beep. The codec module 220 outputs a beep to the speaker 112 via the internal audio data path. Due to the order and timing of switching described above, the speaker 112 plays the beep without any noise although the audio data path is switched from external to internal.

Additionally, the control module 206 instructs the codec module 220 to wait for the beep to be completed before outputting a voice prompt for the telematics function to the speaker 112. The codec module 220 waits for the beep to complete. After the beep is completed, the codec module 220 outputs the voice prompt. Thereafter, the codec module 220 may output audio messages corresponding to the telematics function to the speaker 112.

When the telematics function is completed, the codec module 220 may generate an end function signal to indicate that the telematics function is complete. The control module 206 may validate the end function signal. The control module 206 may validate the end function signal using the same timer used to validate sensor signals.

Thereafter, the control module 206 controls the order and timing of switching the relay 124, the gain, and the audio data path as follows. The control module 206 switches the states of the relay 124, the gain, and the audio data path to the predetermined states. Specifically, the control module 206 switches the audio data path from internal to external without generating switching noise by controlling the gain, the switch SW1 122, and the relay 124 as follows.

The control module 206 first sets the gain of the codec module 220 to a suitable level to play a beep indicating the end of the telematics function. Then the control module 206 starts a timer. For example only, the timer may be 200 ms. After the timer expires, the control module 206 signals the codec module 220 to play the beep indicating the end of the telematics function. The codec module 220 outputs the beep to the speaker 112 via the internal audio data path.

When the beep is completed, the control module 206 turns off the relay 124 by generating (toggling) the relay control signal. Then, the control module 206 sets the audio data path to external. The control module 206 generates the path control signal and sets the switch SW1 122 to position 2.

Thus, the states of the relay 124, the gain, and the audio data path are set to the predetermined states (off, mute, and external, respectively) at the end of the telematics function. If used, the infotainment module 110 may begin or resume outputting infotainment data to the speaker 112 via the external audio data path. Before outputting the infotainment data to the speaker 112 via the external audio data path, the relay 124 may be turned on and set to position 2. Due to the order and timing of switching described above, the speaker 112 outputs the infotainment data without any noise when the audio data path is switched from internal to external.

Figure 3A:
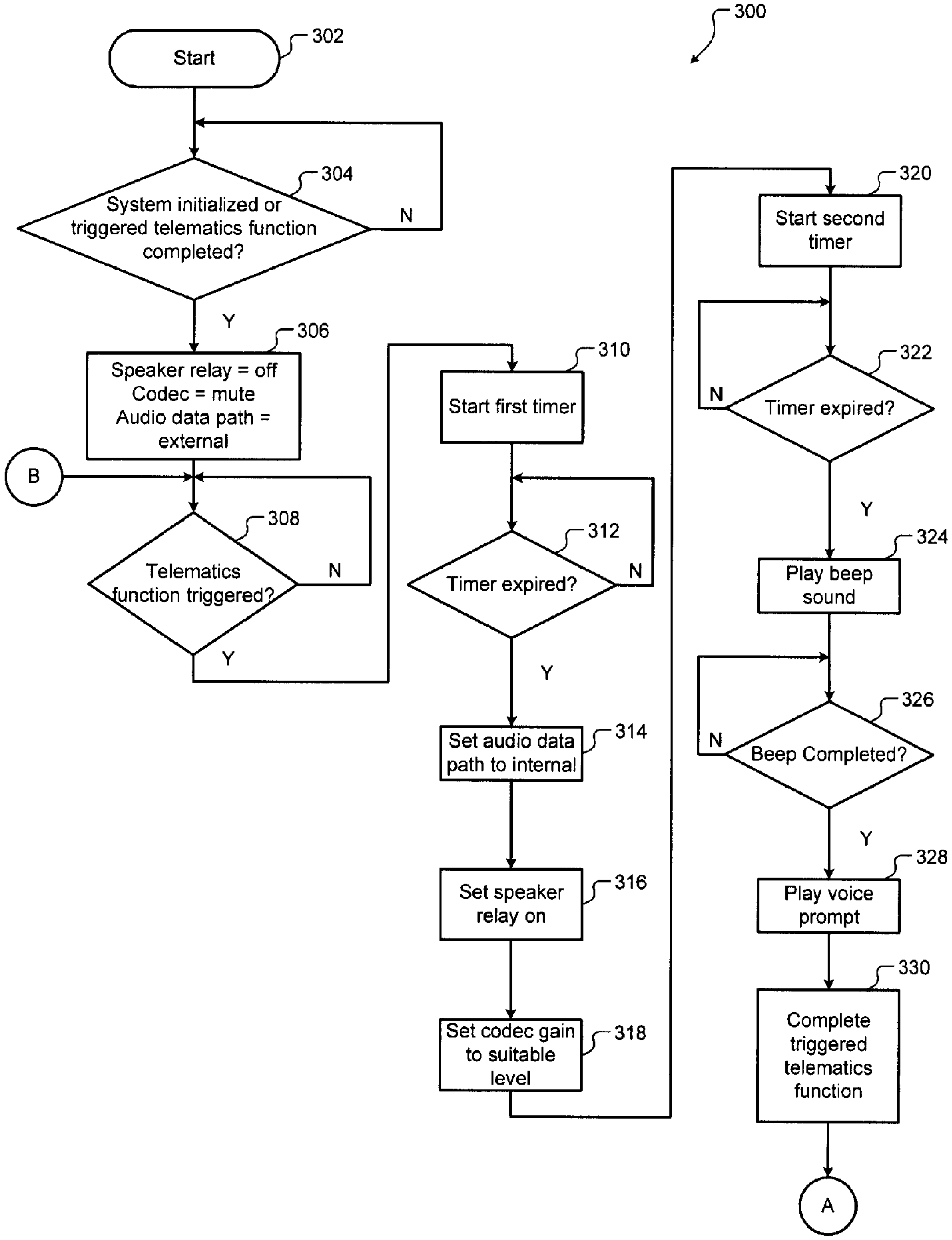
FIGS. 3A and 3B depict a flowchart of a method for minimizing noise in a telematics system of a vehicle when switching audio data paths from external to internal audio data paths and vice versa.
Figure 3B:
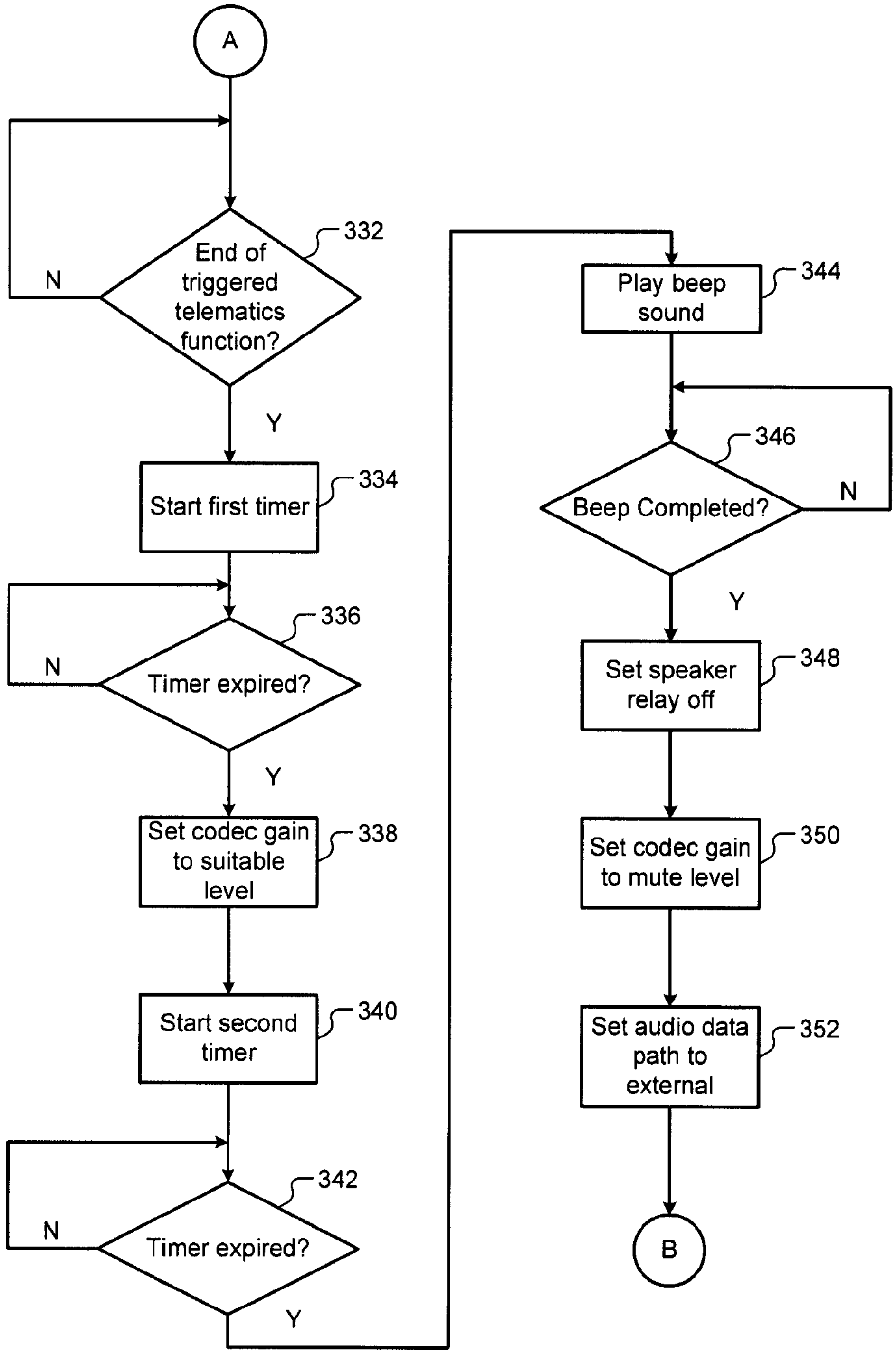

Referring now to FIGS. 3A and 3B, a method 300 for switching audio data paths of telematics systems without introducing switching noise is shown. Control begins at 302. At 304, control determines if the telematics system is initialized or a triggered telematics function is completed. Control waits until the telematics system is initialized or a triggered telematics function is completed.

At 306, control sets states of speaker relay, codec gain, and audio data path to the following predetermined states. Control turns off the speaker relay, mutes the codec, and sets the audio data path to external. Control sets these predetermined states when the telematics system is initialized or a triggered telematics function is completed.

At 308, control determines if a telematics function is triggered. A telematics function may be triggered by a sensor or by pressing a switch on the user interface of the telematics system. Control waits until a telematics function is triggered. Control may process an infotainment application using the external audio data path of the telematics system until a telematics function is triggered.

When a telematics function is triggered, control may start a first timer at 310. Control waits until the first timer expires at 312. When the first timer expires, control sets the audio data path to internal at 314. Control turns on the speaker relay and connects the speaker relay to the internal audio data path at 316. Control sets the gain of the codec to a suitable value at 318.

Control starts a second timer at 320. Control waits until the second timer expires at 322. When the second timer expires, control plays a beep sound through the speaker via the internal audio data path at 324. Control waits until the beep sound is completed at 326. When the beep sound is completed, control plays a voice prompt through the speaker via the internal audio data path at 328. Control completes the triggered telematics function at 330. For example, control plays voice messages related to the triggered telematics function through the speaker via the internal audio data path at 330.

At 332, control determines if the triggered telematics function ended. Control waits until the triggered telematics function ends. Control plays voice messages related to the triggered telematics function through the speaker via the internal audio data path until the triggered telematics function ends.

When the triggered telematics function ends, control starts the first timer at 334. Control waits until the first timer expires at 336. When the first timer expires, control sets the gain of the codec to a suitable value at 338.

Control starts the second timer at 340. Control waits until the second timer expires at 342. When the second timer expires, control plays a beep sound through the speaker via the internal audio data path at 344. Control waits until the beep sound is completed at 346. When the beep sound is completed, control turns off the speaker relay at 348. Control mutes the codec at 350. Control sets the audio data path to external at 352. Control returns to 308.

In method 300, for example only, the first and second timers may be approximately 300 ms and 200 ms, respectively. Control waits approximately 300 ms to ensure that telematics function triggered by a sensor or user interface is valid. Control may wait approximately for a time period T1 to start a voice prompt or a beep after turning on the speaker relay, where T1=200 ms. In some implementations, a minimum value of T1 may be approximately 138 ms. Further, control may wait approximately for a time period T2 to control the audio data path and to mute the codec after turning on the speaker relay, where T2=200 ms. In some implementations, a minimum value of T2 may be approximately 138 ms.

In some implementations, the systems and methods described above are implemented by a computer program executed by one or more processors. For example, the control module 206 may comprise the computer program and the one or more processors. The computer program can reside on a tangible computer readable medium such as but not limited to memory, nonvolatile data storage, and/or other suitable tangible storage mediums.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A telematics system for a vehicle, comprising:

an infotainment module that outputs data to a speaker via a first audio data path;

a codec module that outputs data to said speaker via a second audio data path when a telematics function of said telematics system is triggered; and a control module that switches from said first audio data path to said second audio data path after said telematics function is triggered and that changes a state of a relay of said speaker and a gain of said codec module in a first predetermined order before outputting data to said speaker via said second audio data path.

2. The telematics system of claim 1, wherein said first predetermined order includes:

initially switching from said first audio data path to said second audio data path, then changing said state of said relay from off to on, and then changing said gain of said codec module from a mute level to a desired level.

3. The system of claim 2, wherein said codec module outputs:

a beep sound to said speaker when a first predetermined time period has elapsed after said gain of said codec module is changed to said desired level, and a voice prompt after said beep is completed.

4. The telematics system of claim 1, wherein said control module switches from said second audio data path to said first audio data path after said telematics function is completed, and changes said state of said relay and said gain of said codec module in a second predetermined order before outputting data to said speaker via said first audio data path.

5. The telematics system of claim 4, wherein said second predetermined order includes:

initially changing said state of said relay from on to off, then changing said gain of said codec module to a mute level, and then switching from said second audio data path to said first audio data path.

6. The system of claim 4, wherein said control module switches from said second audio data path to said first audio data path after:

initially, a first predetermined time period has elapsed after said telematics function is completed, then said gain of said codec module is changed to a desired level, then a second predetermined time period has elapsed, and then a beep sound output to said speaker is completed.

7. The telematics system of claim 1, wherein after said telematics system is initialized and after said telematics function is completed, before outputting data to said speaker, said control module:

sets said state of said relay to off, sets said gain of said codec module to a mute level, and selects said first audio data path.

8. The telematics system of claim 1, wherein said telematics function is triggered based on an input received from one of a user interface of said telematics system and a sensor in said vehicle.

9. The telematics system of claim 1 further comprising a validation module that validates inputs triggering said telematics function and that delays triggering of said telematics function until said inputs are validated.

10. A telematics system for a vehicle, comprising:

an infotainment module that outputs data to a speaker via a first audio data path;

a codec module that outputs data to said speaker via a second audio data path; and a control module that initiates a telematics function based on an input received from one of a user interface of said telematics system and a sensor in said vehicle, turns off a relay of said speaker, sets a gain of said codec module to a mute level, and selects said first audio data path in a first order before outputting data to said speaker when said telematics system is initialized and when said telematics function is completed, and turns on said relay, changes said gain, and selects said second audio data path in a second order before outputting data to said speaker when said telematics function is initiated.

11. A method for operating a telematics system of a vehicle, comprising:

outputting infotainment data to a speaker via a first audio data path;

outputting data from a codec module of said telematics system to said speaker via a second audio data path when a telematics function is triggered;

switching from said first audio data path to said second audio data path after said telematics function is triggered; and changing a state of a relay of said speaker and a gain of said codec module in a first predetermined order before outputting data to said speaker via said second audio data path.

12. The method of claim 11 further comprising including in said first predetermined order:

initially switching from said first audio data path to said second audio data path, then changing said state of said relay from off to on, and then changing said gain of said codec module from a mute level to a desired level.

13. The method of claim 12 further comprising outputting from said codec module:

a beep sound to said speaker when a first predetermined time period has elapsed after said gain of said codec module is changed to said desired level, and a voice prompt after said beep is completed.

14. The method of claim 11 further comprising:

switching from said second audio data path to said first audio data path after said telematics function is completed; and changing said state of said relay and said gain of said codec module in a second predetermined order before outputting data to said speaker via said first audio data path.

15. The method of claim 14 further comprising including in said second predetermined order:

initially changing said state of said relay from on to off, then changing said gain of said codec module to a mute level, and then switching from said second audio data path to said first audio data path.

16. The method of claim 14 further comprising switching from said second audio data path to said first audio data path after:

initially waiting for a first predetermined time period to elapse after said telematics function is completed, then changing said gain of said codec to a desired level, then waiting for a second predetermined time period to elapse, then outputting a beep sound to said speaker, and then waiting for said beep sound to complete.

17. The method of claim 11 further comprising, after said method is initialized and after said telematics function is completed, before outputting data to said speaker:

setting said state of said relay to off, setting said gain of said codec module to a mute level, and selecting said first audio data path.

18. The method of claim 11 further comprising triggering said telematics function based on an input received from one of a user interface of said telematics system and a sensor in said vehicle.

19. The method of claim 11 further comprising:

validating inputs triggering said telematics function; and delaying triggering of said telematics function until said inputs are validated.

* * * * *